United States Patent Office 3,390,121
Patented June 25, 1968

3,390,121
COLOR INDICATION IN POLYESTER
RESIN CURING
Bruce Lee Burford, Brooklyn, and Otto S. Kauder,
Jamaica, N.Y., assignors to Argus Chemical Corporation, Brooklyn, N.Y., a corporation of New York
No Drawing. Filed June 16, 1964, Ser. No. 375,634
17 Claims. (Cl. 260—40)

ABSTRACT OF THE DISCLOSURE

Uniform blending of a curing catalyst in the curing of polyester resins is achieved by including a color indicating compound in the polyester resin curing composition. The compositions of the invention include as the indicator a diphenylamine compound having at least one additional resonating group, i.e. a bivalent sulfur, a bivalent imino or a monovalent amino group, which in the presence of a peroxide curing catalyst gives a fugitive color which disappears during the curing.

---

This invention relates to a process for the determination of uniform blending of a curing catalyst in the curing of polyester resins at room temperature, and to an indicating composition for this purpose, as well as to polyester resin compositions ready for curing and which by a change in color give an indication of the uniformity of blending of a curing catalyst therewith. More specifically, this invention relates to the use of diphenylamine compounds having at least one additional resonating group which give a fugitive colored compound in the presence of peroxide coloring catalysts in the curing of polyester resins and to compositions containing such diphenylamine compounds.

Polyester resins, that is, those resins formed by the polycondensation of a di- or polycarboxylic acid with a dihydric alcohol, or diamine, are coming to be in greater use due to their unique and widely variable properties. The polyesters may be tailor-made for specific uses by using different raw materials for forming the polyesters to obtain specific desired properties. Polyesters have reached their high degree of popularity as opposed to, for example, the phenolic three dimensional polymer, due to the fact that the final curing step in the formation of the thermosetting three-dimensional space network is a simple addition reaction without any of the byproducts associated with the condensation reaction of the phenolic resins.

The general procedure for forming the polyester is a first-step condensation or neutralization reaction between the unsaturated polyfunctional acid and the polyfunctional amine or alcohol. This first reaction between difunctional acids and alcohols or amines with the by-product formation of water results in the formation of a linear polyester or polyamide. The unsaturated polyester is then reacted with a monomer having a vinyl group (—CH=CH$_2$), such as styrene, to form a three-dimensional space network thermoset polymer. In the condensation step it is usual to use a mixture of acids rather than a single acid. The degree of unsaturation present may thus be varied by mixing a saturated and an unsaturated acid. The acids or their anhydrides which may be used include itaconic acid, citraconic acid, maleic acid, fumaric acid, among the unsaturated copolymerizable acids, and among the noncopolymerizable acids phthalic acid, isophthalic acid, naphthalic acid, oxalic acid, succinic acid; the above being the most readily available in commercial quantities as well as the cheapest.

The polyfunctional alcohols most commonly used are the bifunctional glycols, the most common being the propylene and ethylene glycols but also including diethylene glycol, dipropylene glycol and their higher homologues.

Materials having specific desired characteristics may be obtained by the use of different acids and alcohols. For example, flexible materials may be obtained by using adipic acid and/or by using longer chain glycols such as diethylene or triethylene glycol. Flame resistant materials may be formed by the use of halogenated acid anhydrides, such as tetrabromo phthalic anhydride or hexachloroendomethylene tetrahydrophthalic anhydride. Other specific properties, such as acid or solvent resistance, are imparted by the use of other glycols such as neopentyl glycol or p,p'-isopropylidene bis-2-phenoxyethanol or 4,4'-isopropylidene bis-cyclohexanol.

The experience of many workers in the field has shown that the unsaturation in the polyester is preferably present in the acid rather than only in the glycol part of the polyester. The degree of unsaturation in the ester chain may, of course, be increased by also using an unsaturated glycol or alcohol such as allyl alcohol; 2,5-dimethyl-3-hexyne-2,5-diol; 3,6-dimethyl-4-octyne-3,6-diol; and 2-butene-1,4-diol.

The most commonly used monomer for copolymerizing with the polyester to form the three dimensional thermoset material is styrene. However, here again the adaptability of this polyester material is manifested by the wide range of additional properties which may be obtained by the whole or partial replacement of the styrene with other materials. For example, the partial replacement of styrene with methylmethacrylate will give a material having a high degree of light stability as well as having an index of refraction identical to that of glass. Similarly, a polymer suitable for use at high temperature is obtained by using as the monomer triallylcyanurate, diallylisophthalate or diallylendomethylene tetrahydrophthalate. Those knowledgeable in the art would easily be able to substitute and add to this group many other materials which would similarly form polyester materials having the desired properties for any specific purpose.

One extremely popular use to which these polyester resins have been put, is the repairing of auto bodies. This sort of work is preferably carried out at room temperature without the use of any external heating means. To achieve this result a mixture of the polyester resin with the cross-linking monomer, i.e. styrene, is mixed with a promoter and a "catalyst" which initiates the curing addition reaction between the linear unsaturated polyester and the monomer at room temperature. The mixed material is placed, before it has become set, as a patch over the affected area of the car body and allowed to set. In a matter of minutes, usually less than an hour, the material has reached a sufficient degree of hardness to allow it to be filed or sanded down, to match the contours of the metal of the car body, and finally painted.

It is of course necessary that the catalyst be intimately mixed with the resin-monomer mixture to ensure that uniform setting of the polyester is achieved. This mixing must be done before the resin mixture begins to gel. Ordinarily, this is most difficult to determine in the relatively short amount of time allowed the operator before he must apply the resin on to the car body.

It is therefore an object of this invention to prepare a composition which will allow the operator to perceive when he has obtained a uniform mixture of his ingredients. It is another object of this invention to provide a polyester curing process incorporating a color indicator for determining when the resin and the curing catalyst have been uniformly blended. Another object is to prepare a composition for curing polyester resins which will change in color when the resin and curing catalyst are mixed and thus indicate by color the uniformity of the mixture but which will lose this color during curing.

These objects are accomplished by a blend of the resin polyester-vinyl monomer mixture and curing catalyst with a small amount of an indicator comprising a diphenylamine derivative having at least one additional resonating group, which derivative reacts quickly with the curing catalyst in situ to form a fugitive colored compound. The resin blend in the course of the curing reaction loses its color, and resumes its natural color, thus also indicating that the resin is cured.

The process basically comprises curing the unsaturated polymerizable polyester, for example diethylene glycol maleate, with a copolymerizable monomer, e.g. styrene, and a curing catalyst, in the presence of the indicator. These materials are intimately mixed. In the presence of the indicator, the curing resin composition turns a different color, and when mixing has become uniform, the color is uniform. As the naked eye can see when the color is uniform throughout the mix, the operator has an obvious indication that the material is thoroughly and uniformly mixed. The color is fugitive, and will disappear when the material reaches a certain degree of cure. This disappearance of color is not fully understood. However, it is believed that it is the result of decomposition of the colored compound in further reactions at the increased temperatures of the exothermal curing reaction.

The color indicator of the invention is used in combination with the resin-monomer mixture and curing catalyst, with which it forms the fugitive colored compound, plus the usual stabilizers, and/or retarders, and/or curing promoters as and if required for satisfactory shelf life and curing at normal ambient temperatures within the range from about 15 to about 45° C. In some cases, as in the case of the imino diphenylamines, the color indicator acts as a polymerization inhibitor, and this is overcome by addition of a compensating amount of a curing promoter. In some cases, as in the case of the phenothiazines, there is no noticeable inhibition, and a promoter is not required. It will in all cases be understood that the composition can be cured at atmospheric temperatures in normal time, and the formulation is adjusted suitably by the well known additives to meet normal curing standards for polyester resins.

The diphenylamine derivatives of the invention can be defined by the formula:

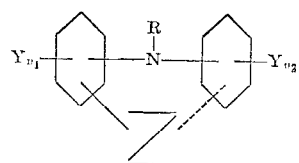

wherein

is a monovalent or bivalent radical attached to one or both of the phenyl groups, in a position ortho or para to the $$\begin{array}{c} N \\ | \\ R \end{array}$$

group and is selected from the group consisting of bivalent sulfur

bivalent imino

and monovalent amino —$NR_1R_2$, wherein R, $R_1$ and $R_2$ are selected from the group consisting of hydrogen, alkyl, alkoxyalkylene, aryloxyalkylene, cycloalkyl, aryl, cycloalkoxyalkylene, having from one to about twenty carbon atoms; Y is alkyl, aryl, condensed with the phenyl as in naphthyl or attached to the phenyl as in diphenyl, alkoxy, halogen or aryloxy having from one to twenty carbon atoms. $n_1$ is an integer from 0 to 4 and $n_2$ is an integer from 0 to 5.

Typical R, $R_1$, $R_2$ and Y radicals are methyl, ethyl, propyl, isopropyl, butyl, sec-butyl, tert-butyl, isoamyl, hexyl, octyl, isooctyl, 2-ethyl hexyl, nonyl, octadecyl, palmityl, lauryl, oleyl, linoleyl, ricinoleyl, phenyl, naphthyl, benzyl, α-phenethyl, β-phenethyl, xylyl, tolyl, cycloheptyl, cyclohexyl and cyclopentyl, methoxyethylene, butoxy-1,2-propylene, ethoxy di (oxyethylene), propoxy-tri-(oxy-1,2-propylene), phenoxyethylene, phenoxy-1,4-butylene, cyclohexoxyethylene, stearoxyethylene, p-xyloxy-1,2-butylene, phenoxy-tri-(oxyethylene) and tolyloxy-di-(oxy-1,2-propylene); and Y can also be phenoxy, methoxy, butyloxy, ethoxy, decyloxy, stearoxy, naphthoxy, benzyloxy, chloro, bromo, fluoro, iodo, xylyloxy, tolyloxy, and mesityloxy.

The following compounds are exemplary of the materials falling within this generic group:

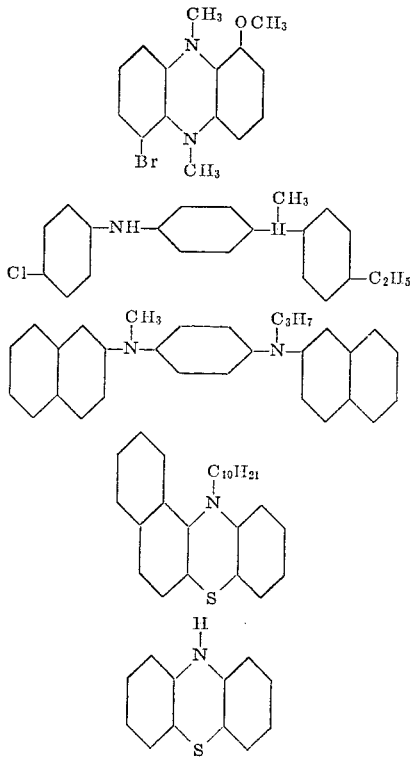

3,390,121
5
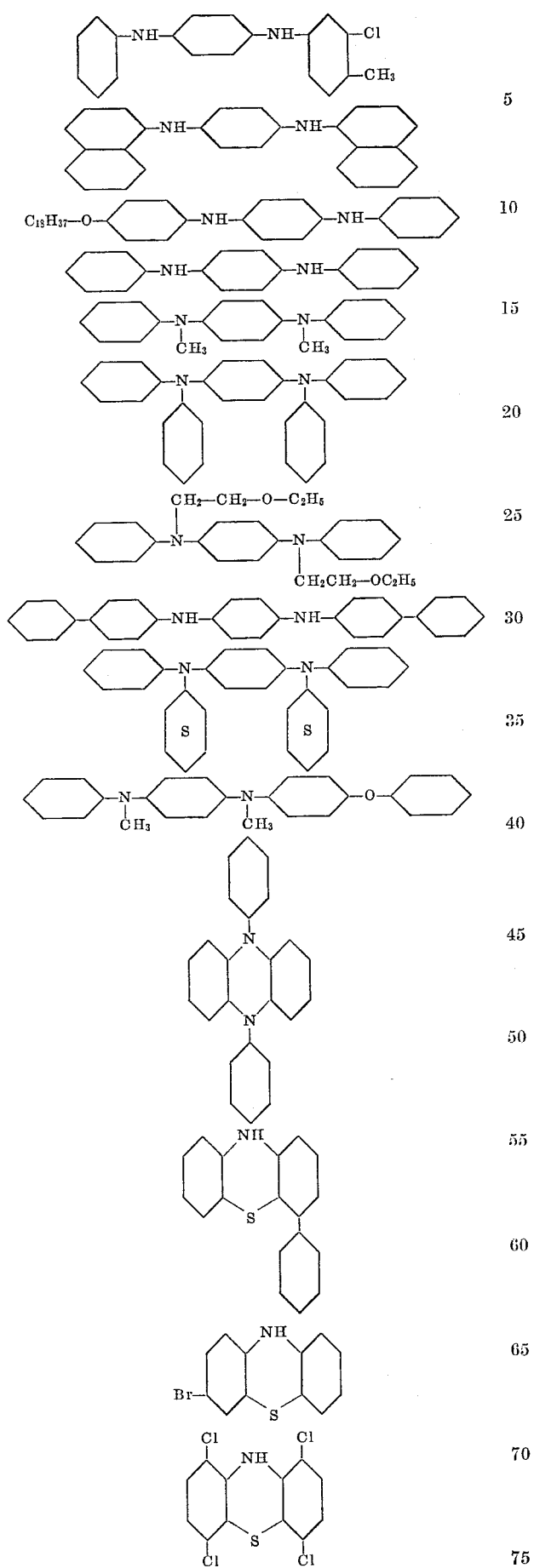
6
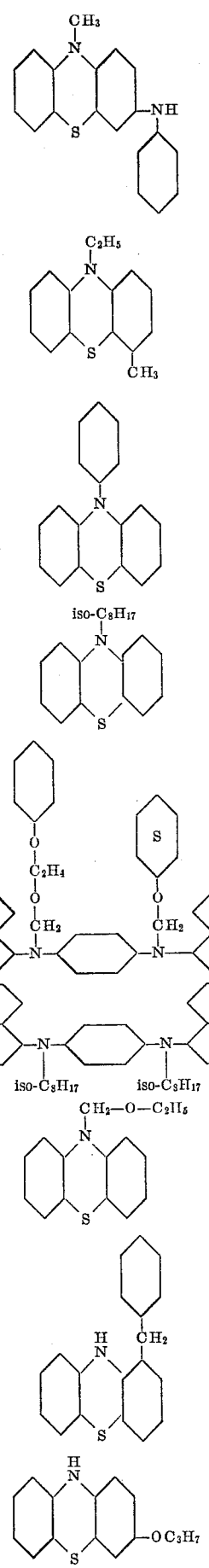

The invention is applicable to the generic class of linear polyesters of dihydric alcohols and an ethylenically unsaturated dicarboxylic acid in which the carboxylic groups are linked to one or both of the ethylenic carbon atoms, (including mixed esters of such ethylenically unsaturated dicarboxylic acids and other dicarboxylic acids) which are capable of polymerization by addition reaction between the ethylenic groups of the polyester to form thermoset products. This type of material is disclosed, for example in U.S. Letters Patent Nos. 2,409,633 and 2,443,735 to 2,443,741 inclusive, granted to Kropa or U.S. Letters Patent 2,450,552 granted to Hurdis. Such liquid, or at least fusible linear polyesters are usually mixed with ethylenically unsaturated monomers and copolymerized in the presence of a peroxide catalyst. This reaction has been extensively elaborated upon in the above patents as well as in numerous other patents and publications. Typical examples of publications are to be found in Industrial and Engineering Chemistry, December 1939, p. 1512 and January 1940, p. 64.

These polymerizable mixtures are now conventional in the art. The foregoing patents and articles in Industrial and Engineering Chemistry are illustrative of the fact. These prior art references are herewith incorporated as a part of this disclosure.

An appropriate ethylenic unsaturated dibasic acid for use in the preparation of an ethylenically unsaturated polyester may comprise a large class. Some of them, designated as component A, are as follows: maleic acid, fumaric acid, aconitic acid, mesaconic acid, citraconic acid, ethyl maleic acid, pyrocinhoninic acid, xeronic acid, itaconic acid, carbic acid (endomethylene tetrahydrophthalic acid).

The chlorine substituted derivatives of the acids, e.g. chloromaleic acid, are also contemplated.

The anhydrides of these acids, where the anhydrides exist, are, of course, embraced under the term "acid," since the reaction products or polyesters are the same. Often it is preferable to operate with the anhydride rather than the free acid. All of these acids are di- or tricarboxylic. Most of them include an ethylenic group in a relation to at least one carboxyl. That is, they include the group

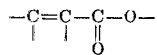

The acids (or anhydrides) which are a, β-ethylenic-α,β-dicarboxylic are especially desirable.

The dihydric alcohols termed component (B) of the polyester embrace such compounds as are included in the following: ethylene glycol, p,p¹-isopropylidene-bis-2-phenoxyethanol, diethylene glycol, 4,4¹-isopropylidene-bis-cyclohexanol, triethylene glycol, polyethylene glycol, 1,3-propylene glycol, 1,2-propylene glycol, dipropylene-(1,3 or 1,2)-glycol, butylene glycol, styrene glycol and neopentyl glycol. Halogen substituted glycols, e.g. monochlor derivatives are contemplated. Unsaturated glycols can be used such as 2,5-dimethyl-3-hexyne-2,5-diol, 2-butene-1,4-diol and 3,6-dimethyl-4-octyne-3,6-diol.

It is to be understood that in addition to unmixed esters the invention contemplates mixed polyesters of dicarboxylic acids in which the polyester molecule is of both an ethylenically unsaturated dicarboxylic acid and a dicarboxylic acid free of any unsaturation adapted to react by addition with ethylenic groups. The principal functioning groups in these non-ethylenic acids, comprising component C, are carboxyls that react by esterification. such acids in the polyester add to the length of the polyester molecules but they do not cross link the polyester molecules but they do not cross link the polyester molecules at points intermediate their ends by addition with the monomer. Often such nonethylenic dicarboxylic acids improve the properties of the resins in which they are introduced. In most instances the mixed polyesters are preferred.

Examples of appropriate dicarboxylic or tricarboxylic acids of the second class are as follows: phthalic acid, naphthalic acid, tetrachlorophthalic acid, succinic acid, adipic acid, suberic acid, azelaic acid, sebacic acid, dimethyl succinic acid, isophthalic acid, oxalic acid, and chlorinated derivatives of these acids.

For purposes of the present invention, the aromatic nuclei of such acids as phthalic are regarded as saturated since the double bonds do not react by addition as do ethylenic groups. The term "acid" also contemplates the anhydrides of the acids. Mixtures of any two of the acids are contemplated.

Naturally, some of the members of components A, B and C are preferable to others. For example, some of them may presently be unduly expensive, but since this condition is often subject to change, they are properly to be included.

It may also be desirable to include a small amount of a drying oil acid or other monocarboxylic acid in the polyester. Drying oil acids impart air drying characteristics to the polyester, or the mixture of the polyester and the vinylic monomer. Appropriate acids termed acid D include those of the following: linolenic acid, linoleic acid, elaeostearic acid, octadecatrienoic acid, clupanodonic acid and acetic or propionic acid.

Mixtures of these acids are contemplated. In addition to or in lieu of the above, monohydric alcohols including ethyl, propyl, allyl or like alcohol may be incorporated in the polyester.

The ethylenic compounds comprise any of the common ethylenic compounds capable of copolymerizing with the unsaturated polyester. Preferably such compounds are liquids and usually they contain the reactive group $H_2C=C<$ linked to a polar group. Generally they are used in the monomeric or syrupy polymer state. The following include some of these compounds: styrene, α-methyl styrene, p-methyl styrene, divinyl benzene, indene; unsaturated esters such as: vinyl acetate, methyl methacrylate, methyl acrylate, allyl acetate, diallyl phthalate, diallyl succinate, diallyl adipate, diallyl sebacate, diethylene glycol bis (allyl carbonate), triallyl phosphate; esters such as those of monohydric or polyhydric alcohols (methyl, ethyl, propyl, allyl, methallyl, vinyl) and an unsaturated polymerizable monocarboxylic acid (acrylic, methacrylic, chloroacrylic). Esters of monohydric unsaturated alcohols (allyl, vinyl, methallyl, crotyl) and mono or polycarboxylic acids (acetic, propionic, succinic, etc.); esters of α,β-unsaturated dicarboxylic acids (maleic, fumaric, itaconic) and monohydric alcohols (methyl, ethyl, propyl, isopropyl, amyl).

Any one of these vinylic monomers (including syrupy mixtures of monomer and polymer) may be combined with any of the polyesters prepared from components A and B; A, B and C; A, B and D; or A, B, C and D as previously described.

Mixtures of any two or more of the foregoing vinylic compounds and the polyesters are contemplated.

The vinylic monomer usually will comprise from 10 to 60% upon a weight basis of the copolymerizable mixture and mixtures containing 20 to 40 or 50% by weight of monomer are to be preferred.

Any peroxide catalyst that can be used for additional polymerization of an unsaturated polyester with an unsaturated monomer can be used in the invention. These are generally organic peroxides. The most common peroxides are: cumene hydroperoxide, Uniperox 60

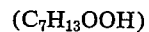

dichlorobenzoyl peroxide, tertiary-butyl hydroperoxide, benzoyl peroxide, tertiary-butyl perbenzoate, acetyl benzoyl peroxide, caprylyl peroxide, lauroyl peroxide, hydroxyheptyl peroxide, methylethyl ketone peroxide, 1-hydroxycyclohexyl hydroperoxide-1, ditertiary-butyl perphthalate, dibenzaldiperoxide, 2,2-(tertiary-butylperoxy) butane, 2,4-dichlorobenzoyl peroxide, and cyclohexane peroxide. Ditertiary alkyl peroxides such as ditertiary butyl peroxide are also considered to be suitable for this purpose. These are all known catalysts and themselves form no part of the invention except in combination with the color indicator.

It should be realized that the catalysts used for the curing of polyesters do not conform to the generally accepted definition of a catalyst, that is, a material that initiates a reaction but is not itself changed during the course of the reaction. The addition polymerization catalysts actually initiate the reaction, and are changed in the reaction.

These mixtures of polyester and vinyl monomer require the addition of inhibitors in order to obtain a shelf-life of reasonable length that will allow formulation of the resin in advance and storage until ready for use.

Many materials inhibit the spontaneous gelling of the mixture during storage. However, some inhibitors have such a powerful effect on retarding this gel reaction that in order to obtain reasonable curing rates at room temperature using peroxide catalysts it is necessary to add such large amounts of a promoter that the shelf-life is decreased. Such inhibitors are called retarders, and are the class into which the color indicators of the invention fall.

Other inhibitors, which are called stabilizers, have a beneficial effect on the storage life of the resin-styrene mixture, and at the same time allow room temperature curing in combination with a small amount of promoter. Such stabilizers include ortho- or para-diphenols, such as hydroquinone, catechol, t-butyl catechol, toluhydroquinone, naphthalene-1,4-diol, and the corresponding quinones; quaternary ammonium salts such as cetyl trimethyl ammonium bromide, phenyl trimethyl ammonium bromide, and trimethyl benzyl ammonium chloride. Amounts of from 0.0025 to 1%, preferably from 0.005 to 0.5%, by weight of the resin are usually employed.

In addition there are many materials which may be added to the resin with the above stabilizer. These materials, while of little value in themselves, enhance the shelf-life when combined with the other stabilizers. They include substituted ammonium and sulfonium salts, cupric salts, and organic phosphites. These materials may all be used with this invention, in amounts ranging from 0.005 to 0.5%.

The promoters which are generally useful for polyester resins, and which are all also useful with this invention, include cobalt salts of monocarboxylic acids, e.g. cobalt, naphthenate, 2-ethylhexoate and tallate, and N,N-disubstituted anilines, e.g. dimethylaniline, diethylaniline, phenyldiethanolamine, dimethyl p-toluidine, diethyl m-toluidine, and m-tolyl diethanolamine. Materials that enhance the activity of the above promoters include zirconyl 2-ethylhexoate and trace amounts of hydrochloric acid, zinc chloride and ammonium chloride. Other promoters which may be used include organic phosphinic acid derivatives and n-butyl sulfite.

Promoters are used in amounts to compensate for the retarding action of the inhibitor and of the color indicator of the invention. Amounts within the range from about 0.05 to 2%, preferably 0.1 to 1.5%, are satisfactory.

The color indicator is used in the resin mixture in a proportion of from about 0.01 to about 0.5%, based on the weight of resin. The proportion of color indicator is at least an amount sufficient to impart a discernible color to the resin composition. More than would unduly inhibit the cure would not usually be used.

Although it is also possible to make a catalyst composition including a pigment which when added to the resin mixture will indicate when the catalyst is completely and uniformly mixed, the continuation of such color in the resin after the curing is not always desirable. However, with applicants' formulation, the color will disappear when the curing is complete. This gives the twofold benefit of a mixing indicator having only a transient coloring effect on the resin and an indicator for determining when the resin has been fully set.

The color indicator can be employed in accordance with the invention in a number of different formulations, which are suitable for marketing or for storage, as may be desired.

The color indicator can be combined, for example, with the promoter in amounts to give the desired rate and degree of color when mixed with the resin and curing catalyst. Such a composition can be combined with a diluent, or a solid carrier for the liquid components. A diluent or carrier serves as an extender, and makes it possible to incorporate very small amounts of the promoter and color indicator using conveniently available equipment. The amount of the diluent can range from 5 to 500% by weight of the promoter-color indicator mixture. Suitable diluents include inert organic solvents for these ingredients, such as petroleum ether, benzene, xylene, methylethyl ketone, dimethyl formamide and dimethyl phthalate. Solid carriers include calcium carbonate, silica, talc, powdered polyvinyl chloride, powdered polyethylene, magnesium silicate, as well as clays, such as bentonite and attapulgite.

The color indicator can also be combined with the resin itself, in which case it is there at the time the curing catalyst is added. Here, again, the color indicator is used in an amount as stated previously to impart the desired color intensity in combination with the curing catalyst.

The color indicator can also be included in compositions with the resin, stabilizing additives, and like components. In this case, also, the amounts of the ingredients are as stated above.

The color indicator can also be combined with the stabilizer, in cases where the stabilizer is sold for combination with the resin, thus forming a composition of resin, stabilizer and color indicator, ready for curing at any desired time.

The proportion of color indicator and stabilizer for such a mixture would be taken to give the required proportions in the resin when mixed therewith.

The color indicator should not be combined with the curing catalyst, since these will react immediately to produce the colored compound, and this compound may decompose prematurely before mixing with the resin is complete, and thus not give the desired effect in accordance with the invention.

The process of the invention is generally effected by simple mixing of the resin, color indicator, curing catalyst, and other additives in any order, except that it must be borne in mind that the color will be obtained only when both the curing catalyst and color indicator are present together. The color indicator and curing catalyst can be added simultaneously, or in either order, and as indicated, the color indicator can also be added to the resin long prior to the time at which the curing is to be effected. The cure is effected at room temperatures within the range from 15 to 45° C., using conventional equipment.

The following examples set forth the preferred embodiments of this invention as envisaged by the inventors.

Example A

A linear polyester was prepared by mixing 789 grams of maleic anhydride, 3557 grams of phthalic anhydride, 2100 grams of diethylene glycol, and 2100 grams of dipropylene glycol, and reacting the mixture up to 220° C. while passing $CO_2$ through the mixture. To the reaction product were added as stabilizers 2.78 grams of toluhydroquinone and 5.56 grams of 1,4-naphthoquinone. To this mixture was finally added 2500 grams of styrene and 550 grams of methyl methacrylate to form a uniform solution.

This material had a Gardner-Holdt viscosity of L–M, an Acid Number of 32.3, and a storage stability (stability at 70° C. in a glass container) of 28 days.

The storage stability test at an elevated temperature is a standard laboratory accelerated procedure for determining the storage life of a given polyester resin. It is presumed that a one week storage life in a 70° C. oven corresponds to a storage life of about one year under room temperature and ordinary warehouse conditions. The test was carried out by placing a glass test tube, two-thirds filled, into an oven heated to 70° C., and examining the mix daily for evidence of gelling or hardness. Any such evidence constituted failure and indicated the end of the test.

This resin was used in many of the examples which follow.

Example 1

To a portion of the resin of Example A was added 0.17% N,N-dimethyl p-toluidine (promoter) and 0.025% copper naphthenate solution (8% Cu) as a stabilizer additive.

This material was divided into several portions. One (Control A) was cured by the addition of 4% benzoyl peroxide (50% paste in butyl benzyl phthalate).

Gel time _____minutes__ 9
Time required to reach peak temperature ____do____ 22
Storage stability at 75° C. (before peroxide addition) _____days__ 22

A putty mix (Control B) was made with another portion of this resin by mixing with 141% talc and 2% TiO$_2$, based on the amount of resin mix present. This material was cured with 2% of the 50% benzoyl peroxide paste.

Gel time _____minutes__ 9.5
Time to reach hardness of Shore D-15 ____do____ 19.5
Storage stability at 70° C. in ½ pint can ____days__ 14

To another portion of the resin of Example A were added as promoters 0.65% cobalt 2-ethylhexoate solution (12% Co) and 0.12% m-tolyldiethanol amine. This resin (Control C) was cured with the addition of 2% by weight of methylethylketone peroxide (60% in dimethylphthalate).

Gel time _____minutes__ 4.5
Peak temperature time _____do____ 9.5
Storage stability at 75° C. in glass _____days__ 25

To determine the effectiveness of the color indicator of this invention, a polyester resin solution of the type formed in Example A, without the addition of the stabilizers and promoters, was mixed with 500 p.p.m. of N,N'-di-beta-naphthyl-phenylenediamine, a color indicator of the invention. This material was divided into several portions, for further tests, in comparison with the above controls. Storage stability at 70° C. was less than 16 hours.

A portion (Portion A) of this material was mixed with 4% of benzoyl peroxide curing catalyst. The material did not gel after several hours test.

A second small portion (Portion B) was mixed with 4% of methylethylketone peroxide until a uniform red color was achieved. The material again did not gel, and the color did not fade out.

To another portion (Portion C) was added as a promoter 0.1% of N,N-di-methyl p-toluidine, and this was then mixed with 4% by weight of benzoyl peroxide paste (50% benzoyl peroxide).

Gel time _____ 3′10″
Stability at 70° C. _____hours__ 3

As it can be seen, this material cured rapidly, but its instability in storage renders it useless as a pre-mixed commercial product.

To another small portion (Portion D) of the resin was added as a promoter, 0.3% cobalt octoate. The promoted resin was then mixed with 1% of a 60% solution of methylethyl ketone peroxide.

Gel time _____ 17′30″
Storage stability at 70° C. _____days__ 3–4

To another sample (Portion E) was added twice as much cobalt octoate as in Portion D, and the same cure and stability tests were made.

Gel time _____minutes__ 13.5
Storage stability at 70° C. _____days__ 3–4

The additional promoter had relatively little effect on the curing rate.

To another small portion (Portion F) of the resin was added, as the promoter, 0.1% N,N'-dimethyl p-toluidine, plus as stabilizers, 0.05% 1,4-naphthoquinone and 0.02% hydroquinone. This mixture was then further blended with benzoyl peroxide until a uniform red color was achieved. This color disappeared when the cure was complete.

Gel time _____minutes__ 5.5
Storage stability at 70° C. _____days__ 10–12

This final combination of resin with coloring amine, promoter, and stabilizer gives a resin very suitable for commercial use. The stability of the material is increased to an acceptable commercial level, and the curing rate is well within the practical range for this material.

Examples 2 to 13

A resin mixture was prepared by mixing 2015 pounds of isophthalic acid, 1994 pounds of triethylene glycol and 1081 pounds of dipropylene glycol. The mixture was stirred and inert gas was passed through it (carbon dioxide and nitrogen at 10 cubic feet per minute) for 9 hours at 200 to 225° C. until the acid number reached 19; then 607 pounds of maleic anhydride was added, and esterification continued until the acid number was 29. The product was then transferred by inert gas pressure into a blending tank, allowed to cool to 120° C., and mixed with 662 grams toluhydroquinone and 1620 grams 1,4-naphthoquinone as stabilizer. The mixture was then cooled to 105° C., and mixed with 1982 pounds of styrene (28.5% of the finished resin) to form a uniform solution. To this resin were also added 51.3 pounds cobalt 2-ethylhexoate (12% Co), 22.8 pounds dimethyl aniline, and 19.4 pounds dimethyl paratoluidine as promoters, and 1.6 pounds copper naphthenate (8% copper) as a stabilizer additive. The final resin mixture had the following properties:

Acid number _____ 21
Gardner viscosity _____ L
Storage stability at 70° C. _____days__ 21

This stabilized and promoted resin was then mixed with a filler comprising 141% of "Sierra C-400" talc and 2.4% of TiO$_2$. 100 gram samples of the resin were mixed with the color indicators listed in Table I. Each sample was blended with 2% by weight of 50% benzoyl peroxide paste (BZQ-50) at room temperature until a uniform color was reached. The material was stirred for about 30 seconds, and then worked back and forth with a spatula until gelation was noted. Further progress in the curing reaction was determined by periodic Shore D hardness determinations. Under usual commercial practice, the resin is considered suitable for filing at a Shore D hardness number of about 15 and is considered suitable for sanding with a power sander at a Shore D hardness number of about 30.

Table I below sets out the gelation time and colors obtained using the coloring agents of this invention. The color appeared immediately after addition of the catalyst.

TABLE I

| Example No. | Color Indicator | Amount, percent | Peroxide Catalyst and amount | Color | Gel Time (Min.) |
|---|---|---|---|---|---|
| Control I | | | 2% benzoyl | | 3 |
| Control II | | | 0.5% MEK [1] | | 9½ |
| 2 | Di-beta-naphthyl-p-phenylenediamine | 0.15 | 2% benzoyl (50% paste) | Red | 4¼ |
| 3 | do | 0.10 | 2% benzoyl | Red | 3¼ |
| 4 | do | 0.10 | 0.5% MEK | Red | 12½ |
| 5 | do | 0.05 | 2% benzoyl | Red | 2¾ |
| 6 | do | 0.05 | 0.5% MEK | Red | 9¼ |
| 7 | do | 0.05 | 1.0% MEK | Red | 4½ |
| 8 | Diphenyl-p-phenylenediamine | 0.15 | 2% benzoyl | Orange-yellow | 5 |
| 9 | do | 0.1 | do | Gold-yellow | 4 |
| 10 | do | 0.1 | 0.5% MEK | do | 39 |
| 11 | do | 0.05 | 2% benzoyl | Yellow | 3 |
| 12 | do | 0.05 | 0.5% MEK | do | 12¾ |
| 13 | do | 0.05 | 1.0% MEK | do | 5 |

[1] Methyl ethyl ketone.

The above table shows the effectiveness of the color indicator in showing color as soon as the catalyst is added. In all cases the color had disappeared by the time the resin had cured.

Examples 14 to 17

Table II shows the reactivity of the resin mixture of Examples 2 to 13 when using 0.075% N,N'-di-beta-naphthylphenylenediamine as the color indicator with various peroxide catalysts:

TABLE II

| Ex. No. | Catalyst and Amount | Time to Form Red Color, sec. | Time to Gel, hrs. |
|---|---|---|---|
| 14 | Cyclohexanone peroxide, 2% | 30 | 1 |
| 15 | Decanoyl peroxide, 4% | 30 | 2 |
| 16 | Dodecanoyl peroxide, 4% | 30 | 2 |
| 17 | Acetyl peroxide, 2% | 30 | 2 |

The time to form the indicating red color is shown to be almost instantaneous, and the period to gelling is within the satisfactory commercial range. The color had disappeared by the time the curing was complete.

Examples 18 and 19

The resin of Example A was combined with 0.05% N,N-dimethyl-p-toluidine as the promoter, to determine gel time and the time for the color to appear after the addition of the catalyst. The color additive was 0.17% of N,N'-di-beta-naphthylphenylenediamine. The results are shown in Table III.

TABLE III

| Ex. No. | Catalyst and Amount | Time to Form Red Color, sec. | Time to Gel, hrs. |
|---|---|---|---|
| 18 | Benzoyl peroxide, 2% | 30 | 2 |
| 19 | Cyclohexanone peroxide, 1% | 30 | 2 |

The color had disappeared by the time curing was complete.

Examples 20 to 42

A commercial flexible polyester resin of the triethylene glycol-phthalate-maleate-styrene type containing a cobalt salt promoter, a dimethylaniline promoter, and hydroquinone as stabilizer, was mixed with Sierra Talc filler as described above in Examples 2 to 13. The resin was mixed with the color indicators shown in Table IV and then blended with benzoyl peroxide catalyst until the color was uniform. In this case the time to gel, and the time to reach a hardness of Shore D-30 as well as the storage stability were measured.

TABLE IV

| Ex. No. | Color Indicator | Added Promoter | Amount, percent | Added Stabilizer | Amount, percent | Color | Gel Time (Min.) | Time to reach Shore "D-30" (Min.) | 70° Stability (Days) |
|---|---|---|---|---|---|---|---|---|---|
| Control III | | None | | None | | None | 6½ | 12¼ | 10 |
| 20 | Di-b-naphthyl phenylenediamine, 0.075% | do | | do | | Red | 12 | 21¼ | |
| 21 | do | Dimethylaniline | 0.1 | do | | Red | 8¼ | 15½ | |
| 22 | do | Diethylaniline | 0.3 | do | | Red | 7¼ | 12¼ | 7 |
| 23 | Di-b-naphthyl phenylenediamine, 0.05% | N,N-dimethyl-p-toluidine (NND) | 0.10 | do | | Red | 4 | 10¼ | 3 |
| 24 | do | NND | 0.05 | do | | Red | 8¼ | 12½ | |
| 25 | do | NND | 0.05 | Toluhydroquinone (THQ) | 0.005 | Red | 6½ | 14 | 9 |
| 26 | do | NND | 0.05 | 1,4-naphthoquinone | 0.0075 | Red | 5½ | 11½ | 14 |
| 27 | Phenothiazine, 0.05% | NND | 0.047 | None | | Green | 5 | 10¼ | 10 |
| 28 | do | NND | 0.047 | 1,4-naphthoquinone | 0.0075 | do | 5½ | 10¾ | 17 |
| 29 | N-isooctyl-phenothiazine, 0.2% | None | | None | | Turquoise | 13¼ | | |
| 30 | N-isooctyl-phenothiazine, 0.05% | do | | do | | Light turquoise | 8 | | |
| 31 | N-n-decyl phenothiazine, 0.2% | do | | do | | Turquoise | 12¾ | | |
| 32 | do | NND | 0.2 | do | | do | 4 | 10¾ | |
| 33 | N-ethoxymethyl phenothiazine, 0.2% | None | | do | | do | 12½ | | |
| 34 | N-ethoxymethyl phenothiazine, 0.2% | do | | do | | Light turquoise | 7¼ | 13½ | |
| 35 | N-ethoxymethyl phenothiazine, 0.05% | do | | do | | Green | 8 | | |
| 36 | 1,2-benzophenothiazine, 0.2% | do | | do | | Deep lavender | 17 | | |
| 37 | 2-isopropoxyphenothiazine, 0.2% | NND | 0.2 | do | | do | 3 | 9½ | |
| 38 | do | None | | do | | Green | 8¼ | | |
| 39 | N-ethoxymethyl-1,2-benzophenothiazine, 0.2% | do | | do | | Peach | 18 | | |
| 40 | N,N'-bis(ethoxymethyl)-N,N'-dinaphthylphenylenediamine, 0.2% | NND | 0.2 | do | | do | 6½ | 16½ | |
| 41 | N,N'-bis(ethoxymethyl)-N,N'-dinaphthylphenylenediamine, 0.5% | None | | do | | Red | 7 | | |
| 42 | N,N'-di-isooctyl dinaphthylphenylenediamine, 0.2% | do | | do | | Peach | 21 | | |

The color appeared in all cases almost immediately upon the addition of the peroxide catalyst. The color disappeared in the above cases when the resin reached a hardness of Shore D-30, a most useful indication of completion of the cure.

The above tables indicate the importance and show the unexpected advantages to be obtained by this invention. Without the addition of extra promoter to compensate for the retarding effect of the coloring indicator the gel time is doubled. Control III had a gel time of 6½ minutes, and Example 20, which contains the di-b-naphthylphenylenediamine or the color indicator but no added promoter, had a gel time of 12 minutes. Example 21, which contained dimethylaniline promoter cured in only 8¼ minutes.

Similarly Example 23 which has less coloring indicator, but still a sufficient amount to be discernible, with an extra 0.1% N,N-dimethyl toluidine promoter cures in only 4 minutes. The phenothiazine derivatives used in Examples 27–38 do not show the retardation characteristics exhibited by the substituted phenylenediamine compounds. Example 30, which uses a small amount of N-isooctyl-phenothiazine, but enough to give an easily discernible color change to the putty, cured in 8 minutes, and Example 34 using N-ethoxymethyl phenothiazine cured in only 7¼ minutes, both well within the range permissible for commercial practice. By adding only a small amount of a promoter, as in Examples 26 and 27, the curing time dropped to only 5 and 5½ minutes.

What is perhaps more significant to commercial workers is the time required to reach a hardness of Shore D-30, at which time the material may be finished. Control III took 12½ minutes to reach this point, while Example 22 took 12¼ minutes, Example 23 only 10¼ minutes. Examples 26–35, and 37 and 38 all reach that hardness in less than 12½ minutes.

Similarly, without the addition of extra stabilizer, the storage stability was also decreased significantly.

Control III had a stability of 10 days in the 70° C. oven. This was with the commercial amounts of promoters and stabilizers. Examples 22 and 23 which contained the coloring additive and extra promoter needed to bring the curing time down to a comparable value to that of Control III have storage times of only 7 and 3 days. However, Examples 25 and 26, both having curing times about equal to that for the control material, have storage times of 9 and 14 days, respectively. All of the examples using the phenothiazine derivative as coloring indicator had suitable storage times.

As can be seen, the use of the color indicator alone, while giving the basic advantages of this invention in indicating when the mixing is complete and also when gelling is complete, has the disadvantages of excessive retardation of curing time and a very short shelf life. Adding the extra promoter, while helpful in decreasing curing time, only shortened the already poor shelf life. However, by adding the extra promoter with a stabilizer to counteract the inhibiting effect of the color indicator there is obtained a resin mixture which has all of the desirable curing and storage properties of the present commercial mixtures and also has the advantages of the invention described herein.

It is of course very desirable to have the color change at a definite stage of the gelling reaction, i.e., when the resin has reached a certain hardness. Shore D-30 hardness is an especially practical value as that is the point at which the cured polymer may be worked (grinding and sanding with power tools).

In commercial practice the resin producer usually adds the promoters and stabilizers required for proper use of his product immediately upon the forming of the uniform mixture of the linear unsaturated polyester with the vinyl monomer. In this situation the converter who adds to this basic resin mix the filler, reinforcers and other additives required for specific uses should also be able to add a single formulation incorporating all of the necessary additional promoters and stabilizers with the coloring compound.

Examples 43–45

The following powdered indicator formulations were prepared and mixed with a commercial type of polyester resin putty of the triethylene glycol phthalate-maleate-styrene type containing the promoter and stabilizer of the resin used in Examples 20 to 42 plus talc filler. This is a usual material used for auto body repair work.

Examples of suitable powdered formulations for red, yellow and green color indicators are the following:

Example 43 (Red indicator)

| | Percent |
|---|---|
| Di-beta-naphthyl-p-phenylenediamine (color indicator) | 30 |
| N,N'-dimethyl-p-toluidine (promoter) | 30 |
| Polyvinyl chloride Geon 101 (extender) | 20 |
| Fine Silica Cab-O-Sil M5 (extender) | 15.5 |
| 1,4-naphthoquinone (stabilizer) | 4.5 |

Example 44 (Yellow indicator)

| | Percent |
|---|---|
| Diphenyl p-phenylenediamine (color indicator) | 30 |
| N,N'-dimethyl-p-toluidine (promoter) | 30 |
| Polyvinyl chloride Geon 101 (extender) | 20 |
| Fine Silica Cab-O-Sil M5 (extender) | 15.5 |
| 1,4-naphthoquinone (stabilizer) | 4.5 |

Example 45 (Green indicator)

| | Percent |
|---|---|
| Phenothiazine (color indicator) | 30 |
| N,N'-dimethyl-p-toluidine (promoter) | 28 |
| Geon 101 polyvinyl chloride (extender) | 20 |
| Cab-O-Sil M5 (extender) | 17.5 |
| 1,4-naphthoquinone (stabilizer) | 4.5 |

It is seen that a compensating quantity of promoter is included to counteract the retarding effect of the color indicator.

The above formulations were added to separate portions of the above auto body putty. The color indicator formulations were added to the putty in a proportion of 0.05% based on amount of the color indicator, by weight of resin.

The putty was then mixed with 2% benzoyl peroxide curing catalyst (BZQ-50) until a uniform color was achieved, and allowed to set.

TABLE V

| Example No. | Color Indicator | Time to Gel, Minutes | Time to reach Shore "D-30" Hardness, Minutes | Time to lose indicator color |
|---|---|---|---|---|
| | Control (none) | 8 | 15½ | |
| 43 | Red | 6½ | 15 | 17 |
| 44 | Yellow | 7½ | 20½ | 20½ |
| 45 | Green | 7 | 12½ | 12½ |

The cured resin of Examples 44 and 45 lost the indicator color at Shore D-30, and Example 43 lost its color within two minutes of reaching Shore D-30. The gel times, and time to reach a hardness of Shore D-30 were substantially the same as the control putty, containing no indicator.

The color imparted by the color indicators of this invention is not affected by the particular peroxide catalyst used, nor by the other materials included in the resin mixture.

The following is claimed:

1. A color indicator composition capable of imparting a transient color to a polyester resin during curing with a peroxide curing catalyst comprising a diphenylamine having at least one resonating group selected from the group consisting of bivalent sulfur, monovalent amino, and bivalent imino radicals the resonating group being directly attached to a phenyl ring of the diphenylamine, and a room temperature polyester resin curing promoter in an amount sufficient to compensate for any retarding effect of the diphenylamine upon the curing rate of the resin.

2. The composition of claim 1, wherein the diphenylamine is a phenylenediamine.

3. The composition of claim 1, wherein the diphenylamine is a phenazine.

4. The composition of claim 1, wherein the diphenylamine is a phenothiazine.

5. The composition of claim 1, comprising in addition a carrier.

6. The composition of claim 1, wherein the color indicator is di-beta-naphthyl-p-phenylenediamine.

7. The composition of claim 1, wherein the color indicator is diphenyl p-phenylenediamine.

8. The composition of claim 1, wherein the color indicator is phenothiazine.

9. A color indicator composition capable of imparting a transient color to a polyester resin during curing with a peroxide curing catalyst comprising a color indicator having the structural formula:

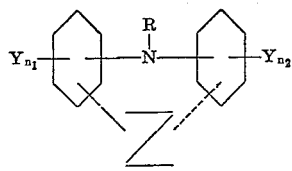

wherein

is selected from the group consisting of bivalent sulfur

monovalent amino

and bivalent imino

wherein R, $R_1$ and $R_2$ are selected from the group consisting of hydrogen, alkyl, alkoxyalkylene, aryloxyalkylene, cycloalkyl, aryl and cycloalkoxyalkylene having from one to about twenty carbon atoms, wherein

is attached in a position relative to the

—N—
 |
 R group selected from the group consisting of ortho and para, Y is selected from the group consisting of alkyl, aryl, alkoxy, and aryloxy having from one to about twenty carbon atoms and halogen, and wherein $n_1$ is an integer within the range of from 0 to 4 and $n_2$ is an integer within the range from 0 to 5, and a room temperature polyester resin curing promoter in an amount sufficient to compensate for any retarding effect of the color indicator upon the curing of the resin.

10. The composition of claim 9, wherein

is a monovalent amino radical.

11. The composition of claim 9, wherein

is a bivalent imino radical.

12. The composition of claim 9, wherein

is a bivalent sulfur

radical.

13. A room temperature curable polyester resin composition comprising an unsaturated polyester, a copolymerizable vinyl monomer, a color indicator capable of imparting a transient color to the polyester during curing with a peroxide curing catalyst and comprising a diphenylamine having at least one resonating group selected from the group consisting of bivalent sulfur, monovalent amino and bivalent imino radicals the resonating group being directly attached to a phenyl ring of the diphenylamine, and a curing promoter in an amount sufficient to compensate for any retarding effect of the color indicator upon the curing of the resin.

14. A room temperature curable polyester resin composition comprising an unsaturated polyester, a copolymerizable vinyl monomer and a color indicator capable of imparting a transient color to the polyester resin during curing with a peroxide curing catalyst and having the structural formula:

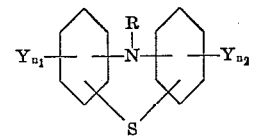

wherein R is selected from the group consisting of hydrogen, alkyl, alkoxyalkylene, aryloxyalkylene, cycloalkyl, aryl and cycloalkoxyalkylene having from one to about twenty carbon atoms, wherein

is attached in a position relative to the

—N—
 |
 R group selected from the group consisting of ortho and para, Y is selected from the group consisting of alkyl, aryl, alkoxy, and aryloxy having from one to about twenty carbon atoms and halogen, and wherein $n_1$ and $n_2$ are integers within the range from 0 to 4.

15. A room temperature curable polyester resin composition comprising an unsaturated polyester, a copolymerizable vinyl monomer, a color indicator capable of imparting a transient color to the polyester resin during curing with a peroxide curing catalyst and having the structural formula:

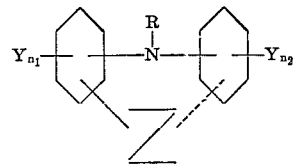

wherein

is selected from the group consisting of bivalent sulfur

monovalent amino

and bivalent imino

wherein R, $R_1$ and $R_2$ are selected from the group consisting of hydrogen, alkyl, alkoxyalkylene, aryloxyalkylene, cycloalkyl, aryl and cycloalkoxyalkylene having from one to about twenty carbon atoms, wherein

is attached in a position relative to the

group selected from the group consisting of ortho and para, Y is selected from the group consisting of alkyl, aryl, alkoxy, and aryloxy having from one to about twenty carbon atoms and halogen, and wherein $n_1$ is an integer within the range of from 0 to 4 and $n_2$ is an integer within the range from 0 to 5, and a room temperature polyester resin curing promoter in an amount sufficient to compensate for any retarding effect of the color indicator upon the curing of the resin.

16. In the process of room temperature curing of a polyester resin which comprises mixing an unsaturated polyester, a copolymerizable vinyl monomer, and a room temperature curing promoter for the polyester with a peroxide curing catalyst at room temperature to form a curing mixture and allowing the mixture to set, the improvement which comprises adding the color indicator composition of claim 1 at a mixing stage to form a transient color therein during the mixing of the catalyst with the resin.

17. The process of claim 16, wherein the color indicator composition is added at a time prior to the addition of the catalyst.

References Cited

UNITED STATES PATENTS

| | | | |
|---|---|---|---|
| 3,010,933 | 11/1961 | Lyon | 260—40 |
| 3,030,329 | 4/1962 | Warnsdorfer | 260—37 |
| 3,210,440 | 10/1965 | Batzer et al. | 260—861 |
| 3,275,709 | 9/1966 | Wooster et al. | 260—861 |
| 3,275,711 | 9/1966 | Wooster | 260—861 |

OTHER REFERENCES

Bjorksten: Polyesters and Their Applications, Reinhold Publishing Corp., 1956, pp. 46, 47, 65–7.

Tomicek: Chemical Indicators, Butterworths Scientific Publications, 1951, pp. 146–154.

JULIUS FROME, *Primary Examiner.*

MORRIS LIEBMAN, *Examiner.*

L. T. JACOBS, *Assistant Examiner.*